Dec. 26, 1922.
P. HENZE.
STEERING DEVICE.
FILED SEPT. 8, 1920.
1,439,816.
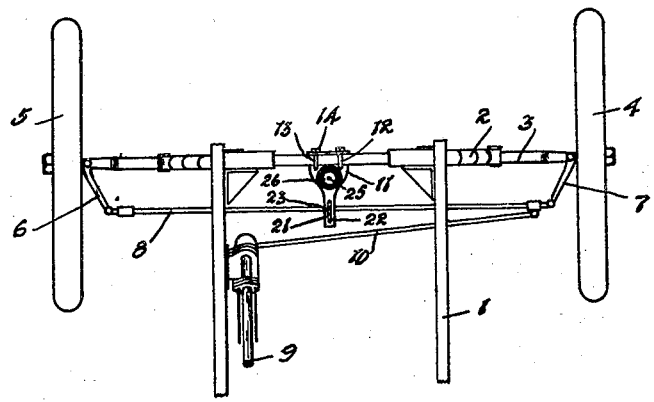
Fig. 1
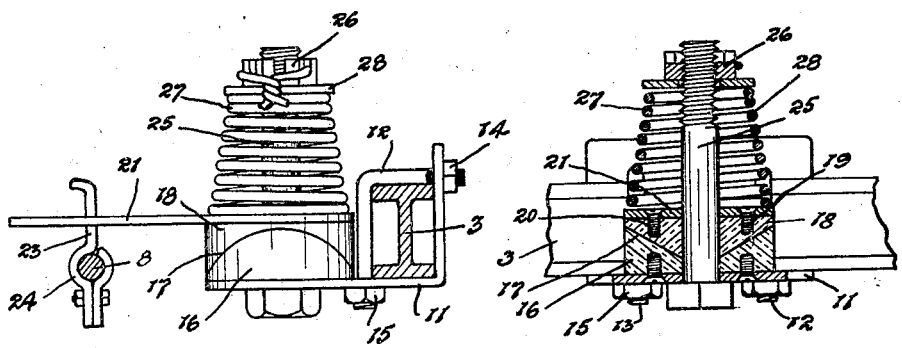
Fig. 2
Fig. 4
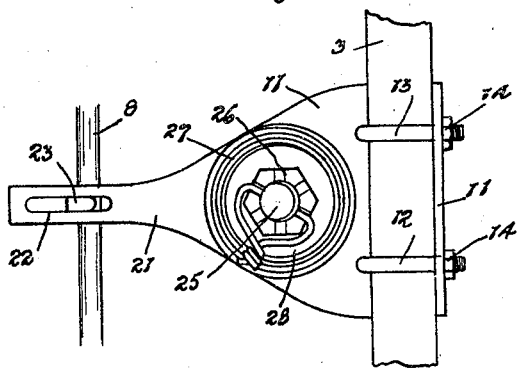
Fig. 3
INVENTOR
P. Henze
BY
Attys Patented Dec. 26, 1922.

1,439,816

UNITED STATES PATENT OFFICE.

PAUL HENZE, OF KAMSACK, SASKATCHEWAN, CANADA.

STEERING DEVICE.

Application filed September 8, 1920. Serial No. 408,898.

*To all whom it may concern:*

Be it known that I, PAUL HENZE, of the town of Kamsack, in the Province of Saskatchewan, Canada, have invented certain new and useful Improvements in Steering Devices, of which the following is the specification.

The invention relates to improvements in steering devices and the general object of the invention is to provide a steering device as an attachment to an automobile which when properly applied will tend to maintain the front or steering wheels of the automobile in a straight or non-turned position and will act to resist to a certain degree the turning of the wheels in the steering operation, such arrangement rendering the operation of steering much easier.

A further object of the invention is to provide a simply constructed durable and inexpensive device which can be readily applied on an automobile without having to change the existing structure, the appliance being particularly designed for use on that type of automobile known as a Ford.

A further object is to construct the device so that it will not only serve its function but is also arranged such that as it wears there is no possibility of rattling.

With the above more important objects in view the invention consists essentially in the arrangement and construction of parts hereinafter more particularly described and later pointed out in the appended claim, reference being had to the accompanying drawings in which:—

Fig. 1 is a plan view of the device as it appears installed on an automobile.

Fig. 2 is an enlarged detailed side view of the appliance.

Fig. 3 is a plan view thereof.

Fig. 4 is a vertical sectional view centrally through the same.

In the drawings like characters of reference indicate corresponding parts in the several figures.

1 is the chassis of an automobile, the front end of which is supported by the spring 2 from the front axle 3. 4 and 5 are the customary front steering wheels mounted in the ordinary way on the ends of the axle spindles and controlled by the steering arms 6 and 7 of the spindles which latter steering arms are connected by the connecting rod 8. 9 is the steering post, the lower end of which is connected by means of the steering rod 10 to the connecting rod 8, the arrangement being such that when the post is turned the rod 8 is shifted endwise and consequently operates to turn the wheels.

I have not considered it necessary to enter into a more detailed description of the above parts as they are well known and are shown as they commonly appear on the well known type of Ford automobile. My steering device which is shortly described in detail is attached centrally to the front axle and is connected by an operating arm centrally to the connecting rod.

The steering device comprises an L-shaped base plate or bracket 11 which is situated centrally of the front axle as best shown in Figure 2 and is detachably secured to the front axle by a pair of L-shaped fastening bolts 12 and 13 each supplied with nuts 14 and 15. Here it will be observed that the lower part of the plate extends somewhat to the rear of the axle and the rear part is provided with a stationary cylindrical base block 16 having a wedge or V-shaped cross groove 17 in the upper face thereof, the groove running in a direction from the front to the rear of the automobile—that is in a direction at right angles to the axle. 18 is a movable cylindrical top block of the same diameter as that 16 and the said block 18 is provided with a V or wedge shaped facial projection on the under side which is complementary to the groove and in which it fits. To the upper face of the block 18 I secure permanently as by fastening screws 19 and 20 the forward circular end of an operating lever or arm 21, the rear end of which is slotted lengthwise as indicated at 22 and over lies the rod 8.

The rear end of the lever 21 is connected to the rod so that it will swing when the said rod is shifted and in the present instance the connection is in the form of an upstanding pin 23 passing through the slot 22 and having the upper end bent at right angles and the lower end suitably clamped as indicated at 24 to the rod 8.

I might here state that when one is attaching the aforesaid parts, care must be taken to have them properly centered this being accomplished by turning the wheels to the straight position as shown in Figure 1 and then connecting the bracket 11 and the pin 23 to the axle and steering rod respectively at their central points. 25 is a comparatively stout pivot bolt passing centrally through the blocks and having the upper end screw threaded and provided with an adjusting nut 26 which after adjustment can be suitably locked. A coiled spring 27 surrounds the upper end of the bolt, the base of the spring resting on the circular end of the lever 21 whilst the top end engages a washer 28 positioned beneath the nut 26. The spring is normally under compression so that the wedge face of the block 18 has a natural tendency to remain seated in the groove of the base block 16. Consequently the arm 21 acts to normally resist any end shifting of the rod 8 with the result that the steering wheels have a natural tendency to remain straight and consequently keep to the road way. If the compression in the spring be increased by tightening down the nut this latter action is increased as will readily be understood.

When the driver, however, desires to make a turn he turns the hand wheel (not shown) to rotate the post 9 which results in the positive shifting of the rod 8 and the consequent swinging of the lever 21. The wedge face of the block 18 accordingly is compelled to turn and ride up the V-shaped walls of the groove and naturally resists the turning movement. The turning of the hand wheel, however, against this resisting action is of small consequence in actual practice and naturally when the turn is being completed the spring 27 is acting to return the blocks to their normal engaged position so that at all times the device acts to return the front steering wheels to their normal or straight position.

Wear will occur between the engaging faces of the blocks but this does not act to produce rattling as the spring 27 will take up any slight wear that may occur.

Whilst I have entered into the details of the structure it will readily be understood that these could be modified without departing from the spirit of the invention as set forth in the accompanying claim.

What I claim as my invention is:—

The combination with the front axle and the connecting rod of a steering gear, of a stationary base block secured centrally to the axle and presenting a V-shaped cross groove extending entirely across the upper face of the block in a direction at right angles to the axle, a pivotally mounted top block having a V-shaped projecting face normally received within and fitting the groove, spring means normally maintaining the facial projection seated in the groove and an arm extending from the top block rearwardly to the steering rod and having the rear end connected centrally to the steering rod.

Signed at the city of Winnipeg, in the Province of Manitoba, this 16th day of August, 1920.

PAUL HENZE.

In the presence of—
GERALD S. ROXBURGH,
K. B. WAKEFIELD.